G. H. CLARK.
SAFETY VALVE.
APPLICATION FILED MAR. 31, 1916.
1,231,330.
Patented June 26, 1917.
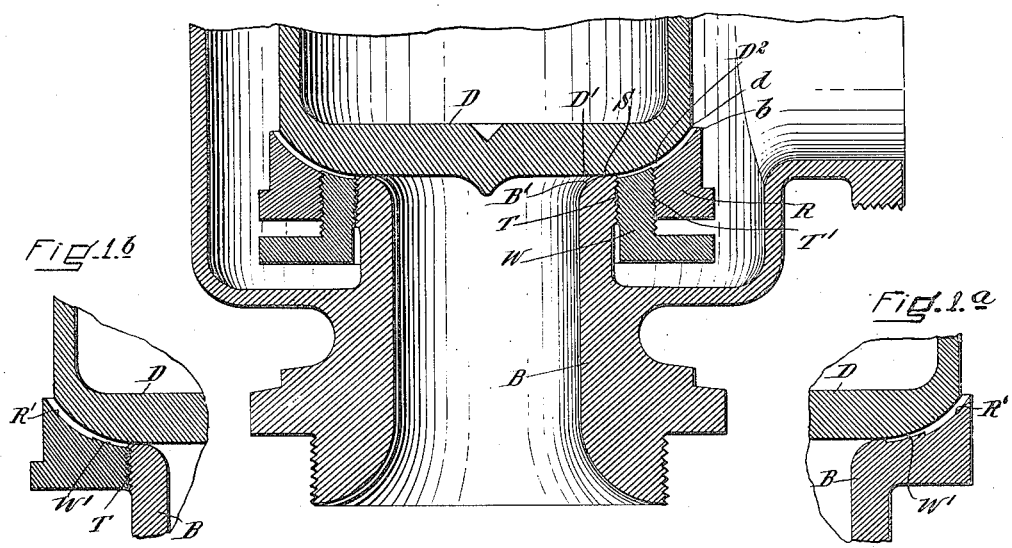
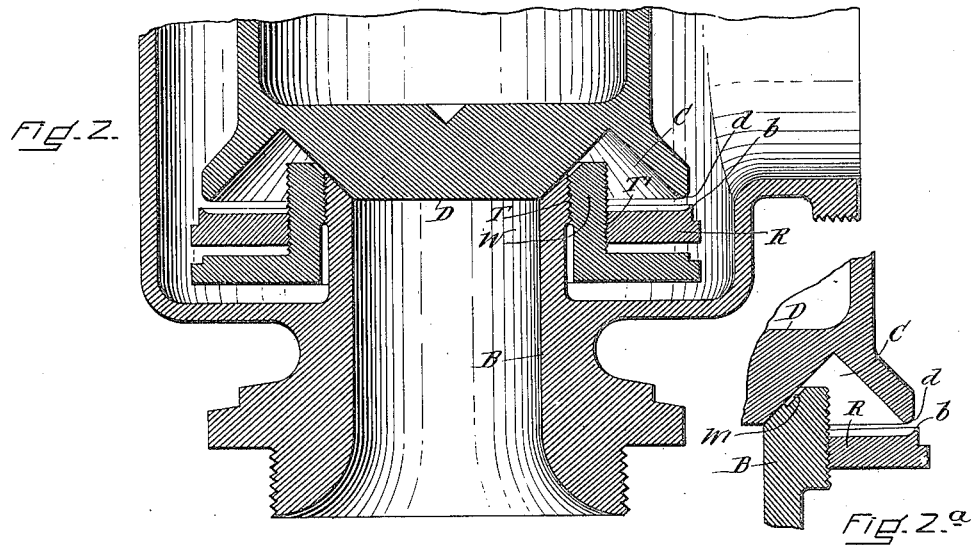
INVENTOR:
George Hall Clark
by Burns Robert Landman
Attorneys

UNITED STATES PATENT OFFICE.

GEORGE HALL CLARK, OF CAMBRIDGE, MASSACHUSETTS, ASSIGNOR TO CROSBY STEAM GAGE & VALVE COMPANY, OF BOSTON, MASSACHUSETTS, A CORPORATION OF MASSACHUSETTS.

SAFETY-VALVE.

1,231,330.

Specification of Letters Patent. Patented June 26, 1917.

Application filed March 31, 1916. Serial No. 87,928.

*To all whom it may concern:*

Be it known that I, GEORGE HALL CLARK, a citizen of the United States, and resident of Cambridge, in the county of Middlesex and State of Massachusetts, have invented new and useful Improvements in Safety-Valves, of which the following is a specification.

My invention relates to safety valves, and has for its object the provision of means for adjusting a safety valve both with respect to its "blow down" and "warning".

Means for adjustment of safety valves in these respects are shown and described in my application for United States patent (Serial No. 77,318, filed February 9, 1916) for improvements in safety valves, in association with the "standard orifice" safety valve which comprises the chief subject matter of that application, and such adjustment means are therein claimed in that association.

"Blow down" and "warning" adjustments, exemplifying my invention, are not confined to association with "standard orifice" safety valves, but may with advantage and utility be applied to safety valves of various types. These improvements are therefore described herein in association with a "standard orifice" type of valve, such as disclosed in my said application, and also in association with a safety valve of the ordinary commercial type.

In the drawings hereto annexed, which illustrate examples of my invention,—

Figure 1 shows, in section, part of a "standard orifice" safety valve, with "blow down" and "warning" adjustments;

Fig. 1ª shows, in section, parts of the base and disk of a valve, wherein the controlling annular surfaces are non-adjustable;

Fig. 1ᵇ shows, in section, parts of the base and disk of a valve, wherein the two controlling annular surfaces are adjustable only in unison;

Fig. 2 shows, in section, part of an ordinary commercial safety valve, with "blow down" and "warning" adjustments; and Fig. 2ª shows, in section, parts of the base and disk of a valve, wherein the inner controlling annular surface is non-adjustable, the outer one adjustable.

In Fig. 1, parts of the valve disk D and base B are shown; the valve spring, casing and hood, and other factors usually associated in safety valve construction are well known, and not shown here. Fig. 1 represents a "standard orifice" safety valve, such as described in my said application. For present purposes it will suffice to describe the characteristics of a "standard orifice" safety valve briefly. A "standard orifice" is one so proportioned that an elastic gas under pressure (such as steam) will, in escaping through the orifice completely fill all portions thereof, and exert maximum pressure on the sides of the orifice, (this pressure being approximately 60% of the absolute boiler pressure) up to a point near the discharge end, where it falls toward the external, or back, pressure. A cylindrical standard orifice will have a toric surface of approach with a radius not substantially less than the diameter of the orifice itself, and this diameter will be uniform, from the throat (or entrance) to the lips at the discharge end.

Thus, a "standard orifice" safety valve is one which, at a predetermined value of lift (by calculation subject to empirical correction) provides an escape orifice which is completely filled by escaping steam, and of which the effective cross sectional area at the throat (or entrance) is approximately equal to the effective cross sectional area at the lips (or discharge end).

This condition is fulfilled by a disk and base having curved opposed surfaces, which as they recede radially from the valve axis progressively approach parallelism to that axis. Since this condition involves the maintenance of maximum lateral pressure on the orifice-surfaces, the maximum lifting effect on the valve disk is secured and maximum discharge efficiency maintained. But a valve of this standard orifice type, unless modified, would possess the practical defect of large "blow down".

Referring again to Fig. 1: The valve base B is provided with two concentric rings, W and R, each adjustably mounted by means of a screw thread connection, at T and T', respectively. The actual seat of the disk D is at S; and to insure the permanent location of the seat at this point, the annular region S should be a little higher than portions of the base surface lying outside the seat. The surfaces of approach to the discharge orifice are at D' and B' respectively, and are so proportioned as to produce the "standard orifice" condition in the escape passage between the disk D and the base B taken in conjunction with the rings W and R. The rings W and R are so shaped that when screwed up close to the disk-surface $D^2$ they, with the base B, present a surface parallel, or coincident, with the surface $D^2$. The surface $D^2$, curving toward parallelism with the valve-axis, terminates at the lip $d$, which lies opposite the lip $b$ in ring R.

With both rings W and R moved up to form a continuous surface with the top of the base B, the valve constitutes a "standard orifice" valve, without modification. At a predetermined lift-value, the effective cross-sectional area of orifice at the throat at S will equal that at the lips $b$, $d$, and as observed above, such a valve will have a very large "blow down."

But if the ring W, carrying the ring R, be backed off a little, so that an initial enlargement of the orificial space extends from the thread T outward to the lips $b$, $d$, the detriment due to large "blow down" will be obviated, and the "blow down" reduced practically to any value desired. Such an adjustment as this would in substance treat the two rings W and R as one, and both together would operate as a means for adjusting the extent of blow down. And, to compensate for the initial clearance produced by backing off the rings, the outer ring and its curvature together with the curved disk-surface should be extended far enough to produce equality in cross sectional area as between the throat and lips of the orifice, when the predetermined value of lift is reached.

Treating the two rings W and R as one, by moving the ring away from the disk, the blow down will be reduced. But when the two rings (acting as one) are adjusted to give small blow down, the drop in pressure due to enlarged clearance will prevent the valve from developing lifting pressure enough—at initial lift—to raise it promptly; in other words to "pop." Consequently the "warning" of the valve will be unduly prolonged.

Herein lies the functional value of the two-ring arrangement. The inner ring W, which in the example shown may be called the "warning ring," if backed away but slightly from a position flush with the base-surface, insures retention of the actual seating surface within a region close to the throat of the discharge orifice between the disk and base, while at the same time conserving to a substantial degree the lifting effect of pressure on the disk-surface immediately opposite to the surface of the ring W. The closer ring W lies to the disk surface $D^2$, the shorter will be the "warning," and the quicker the "pop"; and vice versa. Then, in order to reduce blow down, the ring R may be backed off to a relatively great distance; as with a single blow down ring, the farther ring R is adjusted from the disk D, the smaller will be the blow down, and vice versa.

In practice, a mode of making adjustment will be to start with the warning ring W flush with the base (or backed away enough to make sure that the seat is on the base and near the throat) and back off the blow down ring R until the desired blow down range is secured empirically. Then back off the warning ring W until the desired degree of warning is secured. This adjustment of the warning ring will have no appreciable effect on the blow down; while if the blow down ring alone be readjusted, its readjustment will have no appreciable effect in the warning.

While the adjustable rings are to be preferred, the base (or the disk) of a valve may be formed integrally with annuli of calculated clearance and radial proportions, to secure an acceptable permanent condition in respect to warning and blow down. That is to say, the adjustment may be made once for all by appropriately designing the surface of the base (or disk); or it may be made variable by providing adjustable annuli in the shape of a warning ring and a blow down ring each of which will, in usual practice, be finally fixed in that position of adjustment which affords the desired results. For illustration, Fig. 1ª shows a valve disk and base, in which the warning annulus W' and blow down annulus R' are surfaces parallel with the opposite orificial surface, but spaced therefrom.

A double adjustment of the same kind may be effected in a safety valve of the type heretofore generally employed; such a valve is shown in its essential parts, in Figs. 2 and 2ª. Here the disk D and base B are formed with conical engaging surfaces, and the disk D is extended to furnish the chamber C between the seating cone and the lip $d$, while the base B is outwardly flanged, terminating in the lip $b$. In such a valve, the extent of warning is determined by the extent of conical surfaces opposed near the actual seat, the larger this surface, the shorter the warning. And, in such a valve, the extent of blow down is determined by the initial degree of separation between the lips $b$ and $d$; this separation has been made adjustable in many safety valves heretofore and still in the market.

By providing an adjustable warning ring W, part at least of whose surface lies within the region of opposed conical surfaces near the valve seat, the degree of warning may be adjustably determined. Retraction of the warning ring to a slight distance from the opposite surface has the same effect as would a diminution of the conical opposed surfaces.

The warning ring may be so far withdrawn that its surface ceases to have any effect on the warning, leaving only the fixed portion of the base to determine the length of warning.

And, as in the case of the valve illustrated in Fig. 1, the warning adjustment is independent of the blow down adjustment.

Or, if it be desired to have the blow down annulus adjustable, the warning annulus being fixed at a predetermined clearance, the blow down ring may be adjustably mounted outside the warning annulus, as illustrated in Fig. 2ª, wherein the fixed predetermined warning annulus is shown at W', and the adjustable blow down ring at R.

It is, however, conceivable that the adjustment of warning may be in some cases more important than the adjustment of blow down, and that the blow down ring R may be fixed once for all in relation to the warning ring, and thereafter be moved with the warning ring as the latter is adjusted, as is shown in Fig. 1ᵇ.

Whatever be the specific type of safety valve, the provision of adjustments both for warning and blow down enables the user of the valve to determine its operation in both respects to a nicety, and increases the adaptability of a valve to a miscellany of requirements which heretofore have been met only approximately, or if met fully, have demanded special designs and constructions with consequent increase of cost.

In any valve there will be found a specific feature or factor which determines the blow down, and another which determines the warning. In adapting this invention to any valve, therefore, the equivalent of the blow down rings above described will be found in a member which comprises the feature or factor determinant of blow-down range, and likewise, the equivalent of the warning rings above described will be found in a member which comprises the feature or factor determinant of warning range. And, within practicable limitations, these factors may be incorporated in the base or the disk, or it may be, in both of these principal members of a safety valve.

For most situations, both the blow down annulus and the warning annulus should be made adjustable, and it is preferable that they should be independently adjustable.

What I claim, and desire to secure by Letters Patent is:

1. In a safety valve, the combination with the disk and base, of a warning annulus and a blow down annulus, and means for adjusting the said annuli.

2. In a safety valve, the combination with the disk and base, of a warning annulus and a blow down annulus, and means for adjusting either independently of the other.

3. In a safety valve, the mutually-seating disk and base members, a warning annulus on one of said members outside the seat, having its surface spaced from the adjacent surface of the other member, a blow-down annulus, outside the warning annulus, and means for adjusting the blow-down annulus.

4. In a safety valve, the mutually-seating disk and base members, a warning annulus on one of said members outside the seat, having its surface spaced from the adjacent surface of the other member, and a blow-down annulus outside the warning annulus, and farther spaced from the surface of the opposite member.

Signed by me at Boston, Massachusetts, this 29th day of March, 1916.

GEORGE HALL CLARK.